United States Patent [19]

Smith et al.

[11] 4,368,664
[45] Jan. 18, 1983

[54] APPARATUS TO TRANSFER HEAT TO A PRODUCT AND SIDE LOADING DOOR THEREFOR

[75] Inventors: Donald P. Smith, 4530 Woodfin Dr., Dallas, Tex. 75220; Jarald E. High, Grand Prairie; William W. Plumb, Dallas, both of Tex.

[73] Assignee: Donald P. Smith, Dallas, Tex.

[21] Appl. No.: 203,815

[22] Filed: Nov. 3, 1980

Related U.S. Application Data

[63] Continuation of Ser. No. 901,487, May 1, 1978, abandoned.

[51] Int. Cl.³ .............................................. A47J 37/04
[52] U.S. Cl. ........................................ 99/386; 99/391; 99/423; 99/443 C; 126/190
[58] Field of Search ................ 99/360, 386, 420, 423, 99/427, 443 R, 443 C, 340, 361.2; 49/236, 379; 126/214 D, 190.1, 197; 110/173 R, 173 A; 426/234

[56] References Cited

U.S. PATENT DOCUMENTS

| 586,552 | 7/1897 | Hobson | 126/190 X |
|---|---|---|---|
| 1,708,522 | 4/1929 | Pross, Jr. | 99/337 X |
| 1,737,176 | 11/1929 | Ross | 126/190 X |
| 2,372,362 | 3/1945 | Dawson | 99/443 C X |
| 2,394,811 | 12/1946 | Rymer | 126/190 |
| 2,657,110 | 10/1953 | Feder | 126/190 X |

FOREIGN PATENT DOCUMENTS

| 602262 | 10/1928 | France | 126/190 |
|---|---|---|---|
| 645361 | 10/1928 | France | 126/190 |

Primary Examiner—Harvey C. Hornsby
Assistant Examiner—Joseph M. Pitko
Attorney, Agent, or Firm—Kanz & Timmons

[57] ABSTRACT

An apparatus to transfer heat to a product is disclosed. In one arrangement, the apparatus includes a cabinet which forms a product input port, a product output port and a product support means including a conveyor in the cabinet for transporting the product from the input port to the output port while heat is transferred to the product. Products can be accessed while on the conveyor, including putting products on the conveyor and taking products off the conveyor so that the length of time that a product is heated can be varied while maintaining a substantially constant conveyor speed. One arrangement includes a side loading door for putting products on the conveyor, taking them off of the conveyor and manipulating the products while on the conveyor so that the ordinary heating cycle is altered. The loading door includes a panel hingedly connected to the bottom edge of the opening, movable about an axis of rotation between a closed position and an open position internal to the cabinet. The loading door also includes a handle rigidly affixed to the hinged edge of the panel in such a way that the handle is substantially oppositely disposed about the axis of rotation from the panel so that the handle acts in combination with the panel as a lever for raising and lowering the panel. In one arrangement, the panel includes a tempered glass window. In another arrangement a plurality of loading doors provide preselected, identified positions along the conveyor for preselected heating times.

18 Claims, 4 Drawing Figures

4,368,664

APPARATUS TO TRANSFER HEAT TO A PRODUCT AND SIDE LOADING DOOR THEREFOR

This is a continuation of application Ser. No. 901,487 filed May 1, 1978, now abandoned.

BACKGROUND OF THE INVENTION

1. Field of the Invention

The present invention relates generally to heating products, and in one of its aspects, to a cooking apparatus and a door therefor.

2. Description of the Prior Art

In the past, cooking large volumes of food of a consistently high quality has been a major problem, especially for fast food restaurants. The problem has been made worse because of the desirability of having some of the food preparation take place well in advance of the time for actually serving the final food product, and then freezing the partially prepared food.

Pizzas and french fries are among the most popular of all fast food items, and at the same time, present considerable difficulty in preparation. For example, a pizza is usually made with a thin pastry shell, and is topped with tomato paste, cheese and other toppings. The pizza will heat rapidly from surface heating. Many pizza ovens use stone or other low conductivity material for the product support area in order to limit the rate of heat transfer to the bottom of the pizza. If the bottom of the pizza heats too rapidly, then the crust blisters, lifting the surface of the pizza crust away from the heating surface. The denser dough between the blisters bakes far more slowly, causing the thin shell of the blisters to overbake in order to adequately cook the areas between the blisters. It is, therefore, desirable to bake pizzas relatively slowly to avoid this problem.

French fried potatoes have presented a similar problem since they also can be rapidly warmed by surface heating. Preparing the french fries in advance of the time they are actually to be served and then warming them also presents problems. Microwave heating warms the previously prepared french fries, but leaves them soggy and tasteless. Infrared heating of the previously prepared french fries browns and crisps the surfaces of the fries that are exposed to the incident radiation. Still air oven heating, on the other hand, dries the potatoes out before they become crisp or brown.

Many of the problems which existed in the past were solved by the cooking apparatus of U.S. Pat. No. 3,884,213 issued to Smith. The apparatus described by Smith utilized directed jets of temperature controlled gaseous fluids directly applied to food portions. In one arrangement, jets of air are swept over the product at a proper rate to heat all exposed surfaces.

The apparatus of Smith is particularly well suited for cooking large quantities of quickly prepared foods by use of a conveyor for transporting the food items through the heat transfer space. The problem arises when it is desired to cook more than a single type of food item in the same conveyor type cooking apparatus. For instance, many restaurants cook pizzas as their main product line but would also like to offer sandwiches, thin lasagna in a dish or bulk prepared food. A conveyor type cooking apparatus that would take six minutes to cook pizzas would only take two and one half minutes to cook an open face sandwich, and more than six minutes for some bulk prepared foods. To change the conveyor speed for different products or to change the cooking temperature would necessitate just cooking one type of food product at a time in a single cooking apparatus. Alternatively, the conveyor and heat could be set for the most rapidly cooking items, and the slower cooking items could be run through the apparatus multiple times, but this would require tremendous amounts of work. A system of multiple belts, such moving at a different speed, has also been suggested.

Oven doors, in the past, have generally been one of two types. One type of oven door would swing outward from one side of the door, the opposite side of the door hingedly engaging the cabinet of the cooking apparatus. The other type of door, common on ovens, would swing out from the top with the bottom of the door hingedly engaging the cabinet of the cooking apparatus. In both cases, the handle would be a simple grip attached to the edge of the door which opened away from the cabinet. Further, the door was also the primary input and output port for the cooking apparatus.

Oven doors which open outward expose the user to the hot inner surfaces of the doors. Further, in an apparatus to transfer heat to a product that utilizes turbulent rapidly moving hot air, the turbulent air is close to the outside of the oven and, when the door is opened outwards, hot air rushes over the user causing discomfort and a burn hazard. The escaping hot air also heats the surrounding work area, causing discomfort. Additionally, it accounts for considerable energy loss.

SUMMARY OF THE INVENTION

The present invention concerns an apparatus for transferring heat to a product. The invention can also be used for transferring a negative amount of heat to a product, in other words transferring heat away from a product.

In a preferred embodiment, the product support means of the apparatus includes a cabinet and a conveyor in the cabinet for transporting the product from an input port to an output port while heat is transferred to the product. The apparatus also includes a means for accessing the product while the product is on the conveyor, including putting the product on the conveyor and taking it off the conveyor so that the length of time that a product is heated can be varied by selecting the amount of conveyor travel while maintaining a substantially constant conveyor speed and heating temperature. A preferred embodiment of the apparatus transfers heat to a product by the use of high velocity heated air directed at the product while on the conveyor.

The means for accessing the product includes, in one embodiment, an opening formed in the cabinet adjacent to the product space, the space within the cabinet which can be occupied by the product. The door, which is used for accessing the product, includes a panel hingedly connected to the bottom edge of the opening in the cabinet, movable about an axis of rotation between a position substantially closing the opening and an open position internal to the cabinet. The door also includes the handle rigidly affixed to the hinged edge of the panel in such a way that the handle is substantially oppositely disposed about the axis of rotation from the panel. The handle thus acts in combination with the panel as a lever for raising the panel to the substantially closed position and lowering the panel to the open position.

In a preferred embodiment, the panel extends substantially to the edge of the product space when in the open position. The panel thus acts as a shield for protecting a user of the door from heat coming from below the product space of the heating apparatus. This feature is especially important when jets of heated air are used below the product space, directed at the product. The apparatus also includes a shield extending from above the opening substantially to the edge of the product space whereby the shield protects a user of the loading door from heat coming from above the product space, such as heat in the form of hot air jets coming from above the product space.

The apparatus also includes a bumper for stopping the downward motion of the panel so that the bottom edge of the opening and the bumper define the open position of the panel.

A preferred embodiment of the door includes a handle which is substantially bracket-shaped so that the ends of the bracket-shaped handle are rigidly affixed to the hinged edge of the panel and the portion of the handle between the two ends is substantially oppositely disposed about the axis of rotation from the panel and serves as a grip for a user of the door.

In a preferred embodiment, the panel comprises a tempered class viewing window so that a user can view the product space when the panel is in the position substantially closing the opening.

In a conveyor type embodiment, the door is used as a side loading door for placing products on the conveyor, taking products off of the conveyor, or otherwise manipulating the product so as to alter the heating cycle which would take place when a product is placed on the input port and conveyed to the output port without interruption.

These and other objects, advantages and features of this invention will be apparent from the following description taken with reference to the accompanying drawings, wherein is shown the preferred embodiments of the invention:

DETAILED DESCRIPTION

Figure 1:
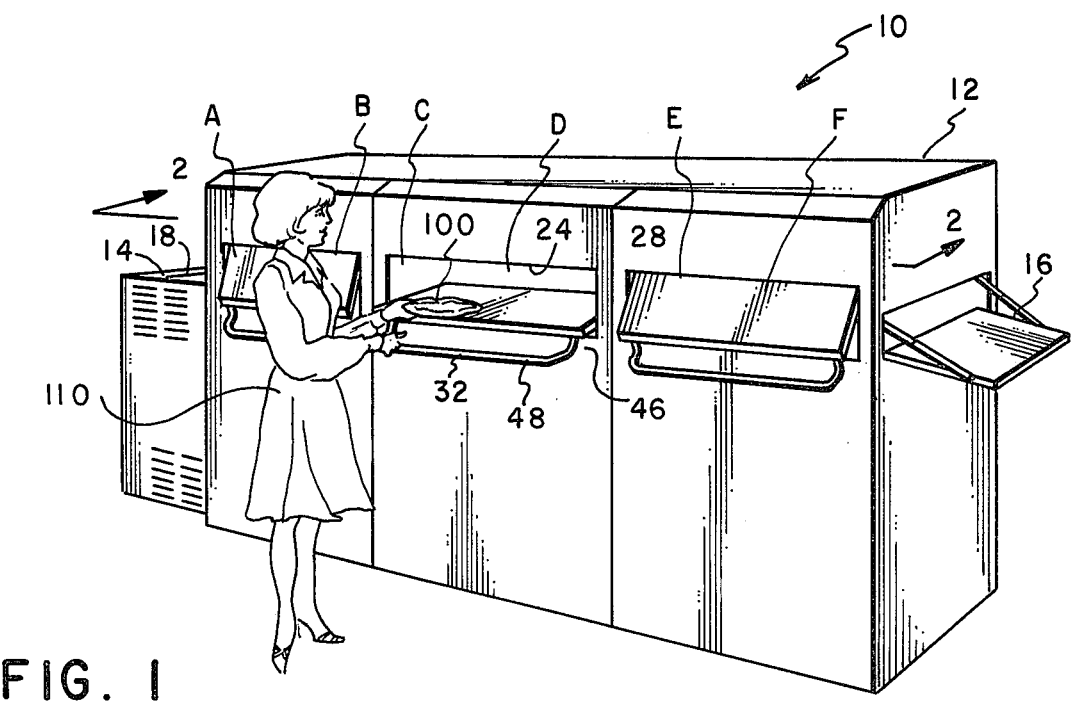
FIG. 1 is a pictorial representation of a cooking apparatus and door therefor in accordance with the present invention and a user of the door.

Referring now to the drawings, a cooking apparatus according to the present invention is referred to generally by reference numeral 10. Although specific reference is made to a cooking apparatus, the principals used in the cooking apparatus would equally apply to a general apparatus for transferring heat to a product. Cooking apparatus 10 includes a cabinet 12 forming a product input port 14 and a product output port 16. Cooking apparatus 10 further includes a product support means comprising a conveyor 16 within cabinet 12 for transporting a product to be heated from input port 14 to output port 16. Conveyor 18 is driven by means of a conveyor motor 19 and a pulley system 19a.

Conveyor 18 includes a product transporting portion 20 on which a product 100 is carried from input port 14 to output port 16. A product space 22 through which product 100 is carried during a normal heating cycle is provided immediately above product transporting portion 20 of conveyor 18.

Figure 2:
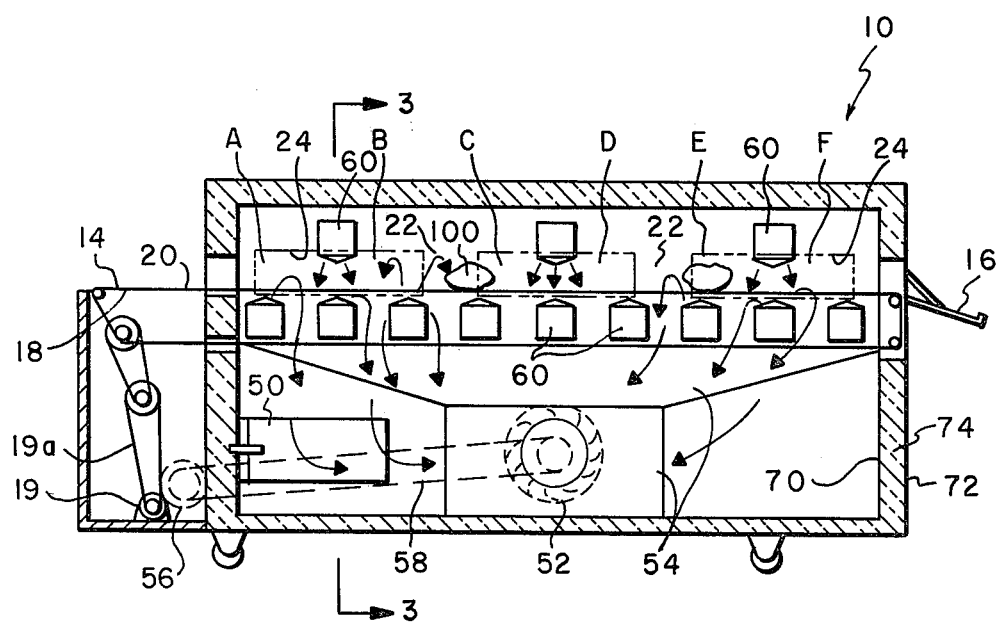
FIG. 2 is a sectional view of the cooking apparatus taken at 2—2 of FIG. 1.
Figure 3:
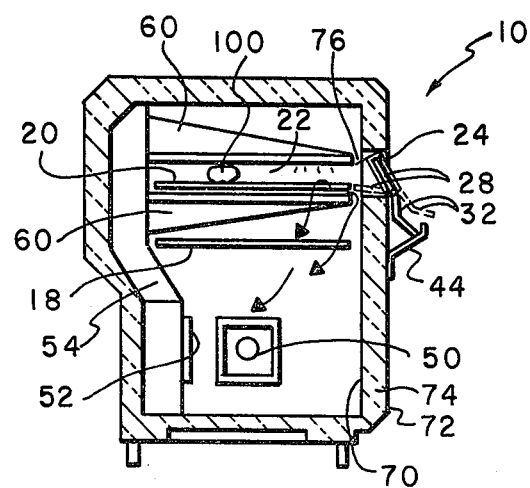
FIG. 3 is a sectional view of the cooking apparatus and door therefor taken at 3—3 of FIG. 2.

Cooking apparatus 10 further includes a means for accessing product 100 on conveyor 18, the means comprising an opening 24 for accessing the product, formed in cabinet 12, shown in dashed lines in FIG. 2, adjacent to product space 22 substantially above transporting portion 20 of conveyor 18. Preferably the means for accessing product 100 includes a plurality of openings 24 for accessing the product, the plurality of openings 24 formed in cabinet 12 adjacent to product space 22 substantially above transporting portion 20 of conveyor 18, spaced along the length of the conveyor. Means for accessing product 100 further includes a door 26. Door 26 is movable between a position substantially closing opening 24 and an open position.

Figure 4:
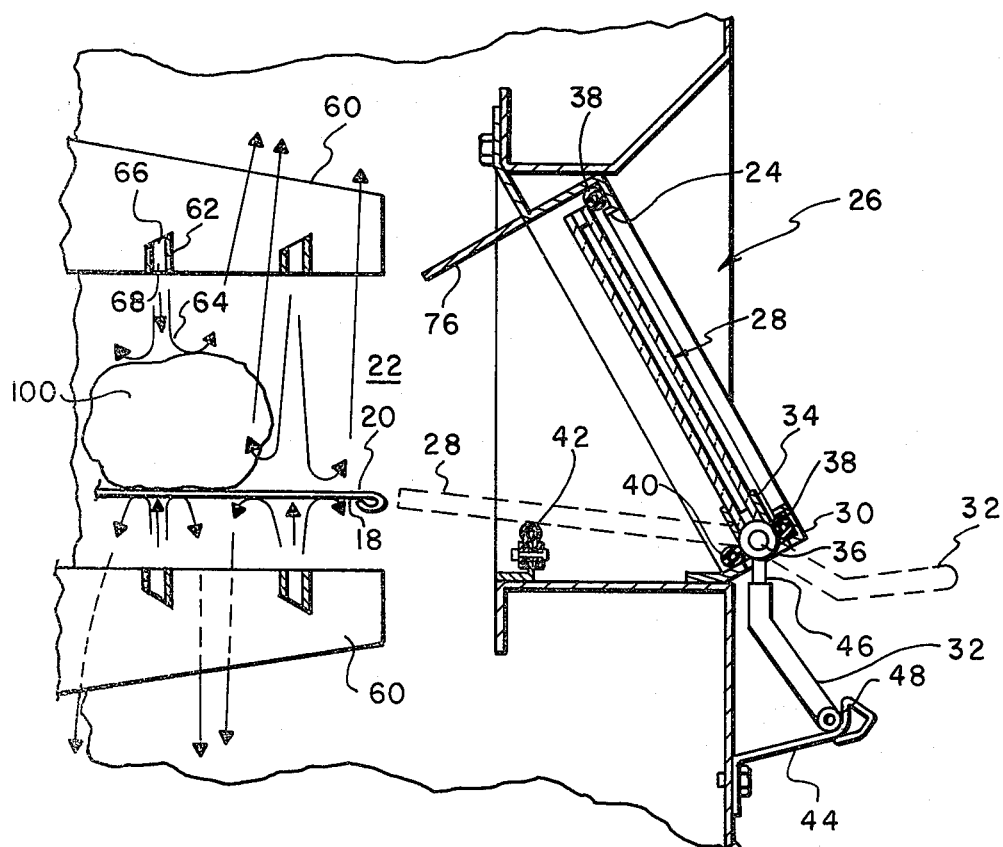
FIG. 4 is a detail view of the door as shown in FIG. 3.

Referring now to FIG. 4, door 26 comprises, in combination, a panel 28 hingedly connected to the bottom edge 30 of opening 24 in cabinet 12, and a handle 32 rigidly affixed to the hinged edge 34 of panel 28. Panel 28 is movable about an axis of rotation 36 between a position substantially closing opening 24, shown in solid lines in FIG. 4, and an open position internal to cabinet 12, shown in dashed lines in FIG. 4. Handle 32 is substantially oppositely disposed about axis of rotation 36 from panel 28 whereby handle 32 acts in combination with panel 28 as a lever for raising panel 28 to the substantially closed position and lowering panel 28 to the open position.

A preferred embodiment of panel 28 comprises a tempered glass viewing window whereby user 110 can view product space 22 when panel 28 is in the position substantially closing opening, thus allowing the user to view the progress of the product and also to see clear spaces on the conveyor for placing more products in the product stream. Another embodiment of panel 28 comprises double paned glass, providing additional insulation and an even cooler surface for the user's hands when in the open position.

In a preferred embodiment, door 26 also includes a silicon rubber gasket 38 around the periphery of opening 24 so that panel 28 makes a good seal with opening 24 when in the substantially closed position. Door 26 also includes silicon rubber gasket 40 which sealingly engages the cabinet side of hinged edge 34 of panel 28 to ensure adequate sealing between cabinet 12 and door 26 when panel 28 is in the substantially closed position.

Apparatus 10 further comprises a bumper 42 for stopping the downward motion of panel 28 whereby bottom edge 30 of opening 24 and bumper 42 define the open position of panel 28.

Apparatus 10 further comprises a catch 44 situated on the outside of cabinet 12 below opening 24. Catch 44 is suitable for engaging handle 32. Handle 32 engages catch 44 when panel 28 is in the substantially closed position and holds the panel in the substantially closed position as long as the catch is engaged. Catch 44 can be disengaged from handle 32 in order to lower panel 28 to the open position. In the embodiment illustrated, catch 44 is similar to a leaf spring, and can simply be pushed down out of the way of the handle with the thumb of the hand used to grip the handle. A preferred form of handle 32 is substantially bracket-shaped so that the ends 46 of bracket-shaped handle 32 are rigidly affixed to hinged edge 34 of panel 28. Portion 48 of handle 32 between the two ends 46 is substantially oppositely disposed about axis of rotation 36 from panel 28. Portion 48 of handle 32 serves as a grip for a user of door 26.

In a preferred embodiment of cooking apparatus 10, a heater, such as gas burner 50 is located within the cabinet below conveyor 18. Near the heat exhaust area of gas burner 50 is a blower 52 which draws hot air from the burner into a plenum 54. Blower 52 is driven by means of belt 58 by blower motor 56 which is located away from the heat of gas burner 50. Plenum 54 is terminated by jet fingers 60. Jet fingers 60 include tubes 62 which form the hot air drawn into plenum 54 into jets 64 of hot air by means of air scoops 66 and passages 68. Cabinet 12 includes both an inner wall 70 and an outer wall 72. The space between inner wall 70 and outer wall 72 is substantially filled with insulating material 74 to prevent heat loss from cabinet 12.

When in the open position, panel 28 extends substantially to the edge of product space 22 whereby panel 28 acts as a shield for protecting user 110 of door 26 from heat coming from below the product space, such as from hot air jets 64. Cooking apparatus 10 also comprises a shield 76 extending from above opening 24 substantially to the edge of product space 22 whereby shield 76 protects a user 110 of door 26 from heat coming from above the product space, such as heat coming from hot air jets 64 located above product space 22. Further, since panel 28 opens inwardly, user 110 reaches over the cool outer face of the panel, reducing the chance and severity of burns.

Referring again to FIG. 2, labeling successive areas of product space 22 as A, B, C, D, E, and F to trace the path of product 100 as it proceeds from input port 14 to output port 16, a typical example for a cooking apparatus according to this invention, utilizing a conveyor 18 comprising a stainless steel wire mesh, a bake time for pizzas is approximately six minutes. If a pizza takes approximately six minutes and runs the full cycle from input port 14 to output port 16, then an open face sandwich would be inserted at D to give approximately two minutes bake time. Rolls to be heated and freshened are inserted at E, and rolls or bread to be toasted are inserted at C. Individual servings of prepared food such as tamales, thin lasagna in a dish, or meatballs and spaghetti can be inserted at A to heat five minutes for serving. It can thus be seen, that a cooking apparatus according to this invention gives high heat transfer at relatively low temperature so that a wide variety of foods can be heated at the same temperature and conveyor speed by simply varying the bake time which is automatically controlled by the position where the item is placed on the conveyor by use of door 26.

One example of a nonfood use of the invention is in heating rubber preforms before molding. The thicker preforms are laid in at the product input port and carried through the full heat transfer zone. Thinner sections would be overheated by such timing and can be inserted at the side of the conveyor to be available for molding after a shorter time.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for transferring heat to a product, comprising in combination:
   a product support means comprising a conveyor for transporting the product while heat is transferred to the product;
   a cabinet enclosing the conveyor wherein the cabinet forms a plurality of openings for accessing the product on the conveyor, with at least one of the openings adjacent to the space immediately above the transporting portion of the conveyor and spaced apart from the ends of the full normal conveyor cycle, having a substantially horizontal bottom edge with a bottom outside corner and a bottom inside corner, and a top edge with a top inside corner;
   a panel hingedly connected to the bottom outside corner of the at least one opening, movable about an axis of rotation between an open position internal to the cabinet extending substantially completely across the bottom edge to a point adjacent the conveyor and a substantially closed position extending from the bottom outside corner of the opening to the top inside corner of the opening whereby the panel acts as a shield in the open position for protecting a user of the apparatus from being burned when placing or removing a product on said conveyor by hand by the bottom edge when the bottom edge is hot and from hot air blasts coming up from between the conveyor and the cabinet, and whereby the top edge of the opening is cooled by air from outside of the cabinet when the panel is in the closed position, reducing the chance of a user being burned by the top edge; and
   a handle rigidly affixed to the hinged edge of the panel wherein the handle is substantially oppositely disposed about the axis of rotation from the panel whereby the handle acts in combination with the panel as a lever for raising the panel to the substantially closed position and lowering the panel to the open position wherein the panel will go to the open position in the absence of force on the handle.

2. An apparatus according to claim 1 further comprising a shield extending from above the opening substantially to the edge of the product space whereby the shield protects a user of the door from heat coming from above the product space.

3. An apparatus according to claim 2 further comprising a bumper affixed to the bottom edge of the at least one opening near the bottom inside corner for stopping the downward motion of the panel whereby the bottom outside corner of the bottom edge of the opening and the bumper define the open position of the panel, wherein the panel extends substantially to the edge of the product space when in the open position whereby the panel acts as a shield for protecting a user of the door from heat coming from below the product space.

4. An apparatus according to claim 3 further comprising a catch suitable for engaging the handle, the catch situated on the outside of the cabinet below the opening, wherein the handle engages the catch when the panel is in the substantially closed position whereby the catch holds the panel in the substantially closed position when the catch is engaged, and the catch can be disengaged from the handle in order to lower the panel to the open position.

5. An apparatus according to claim 4 wherein the handle is substantially bracket-shaped so that the ends of the bracket-shaped handle are rigidly affixed to the hinged edge of the panel and the portion of the handle between the two ends is substantially oppositely disposed about the axis of rotation from the panel and serves as a grip.

6. An apparatus according to claim 2 wherein the panel comprises a tempered glass viewing window whereby a user can view the product space when the panel is in the position substantially closing the opening.

7. An apparatus according to claim 6 further comprising a bumper affixed to the bottom edge of the at least one opening near the bottom inside corner for stopping the downward motion of the panel whereby the bottom outside corner of the bottom edge of the opening and the bumper define the open position of the panel, wherein the panel extends substantially to the edge of the product space when in the open position whereby the panel acts as a shield for protecting a user of the door from heat coming from below the product space.

8. An apparatus according to claim 1 further comprising a bumper affixed to the bottom edge of the at least one opening near the bottom inside corner for stopping the downward motion of the panel whereby the bottom outside corner of the bottom edge of the opening and the bumper define the open position of the panel, wherein the panel extends substantially to the edge of the product space when in the open position whereby the panel acts as a shield for protecting a user of the door from heat coming from below the product space.

9. In an apparatus for transferring heat to a product, the apparatus including means for supporting the product and a cabinet which forms an opening for accessing the product, the opening having a substantially horizontal bottom edge with a bottom outside corner and a bottom inside corner, and a top edge with a top inside corner, a door comprising in combination:
 a panel hingedly connected to the bottom outside corner of the opening in the cabinet, movable about an axis of rotation between a position substantially closing the opening extending from the bottom outside corner of the opening to the top inside corner of the opening and an open position internal to the cabinet extending substantially completely across the bottom edge to a point adjacent the means for supporting the product whereby the panel acts as a shield for protecting a user of the door from being burned when placing or removing a product on said conveyor by hand by the bottom edge when the bottom edge is hot and from air blasts coming up from between the conveyor and the cabinet, and whereby the top edge of the opening is cooled by air from outside of the cabinet when the panel is in the closed position, reducing the chance of a user being burned by the top edge; and
 a handle rigidly affixed to the hinged edge of the panel wherein the handle is substantially oppositely disposed about the axis of rotation from the panel whereby the handle acts in combination with the panel as a lever for raising the panel to the substantially closed position and lowering the panel to the open position wherein the panel will go to the open position in the absence of force on the handle.

10. A door according to claim 9 wherein the panel extends substantially to the edge of the product space when in the open position whereby the panel acts as a shield for protecting a user of the door from heat coming from below the product space of the heating apparatus.

11. A door according to claim 10 to be used with a catch suitable for engaging the handle, the catch situated on the outside of the cabinet below the opening, wherein the handle engages the catch when the panel is in the substantially closed position whereby the catch holds the panel in the substantially closed position when the catch is engaged, and the catch can be disengaged from the handle in order to lower the panel to the open position.

12. A door according to claim 11 wherein the handle is substantially bracket-shaped so that the ends of the bracket-shaped handle are rigidly affixed to the hinged edge of the panel and the portion of the handle between the two ends is substantially oppositely disposed about the axis of rotation from the panel and serves as a grip.

13. A door according to claim 9 wherein the panel comprises a tempered glass viewing window whereby a user can view the product space when the panel is in the position substantially closing the opening.

14. A door according to claim 13 wherein the panel extends substantially to the edge of the product space when in the open position whereby the panel acts as a shield for protecting a user of the door from heat coming from below the product space of the heating apparatus.

15. A door according to claim 14 to be used with a catch suitable for engaging the handle, the catch situated on the outside of the cabinet below the opening, wherein the handle engages the catch when the panel is in the substantially closed position whereby the catch holds the panel in the substantially closed position when the catch is engaged, and the catch can be disengaged from the handle in order to lower the panel to the open position.

16. A door according to claim 15 wherein the handle is substantially bracket-shaped so that the ends of the bracket-shaped handle are rigidly affixed to the hinged edge of the panel and the portion of the handle between the two ends is substantially oppositely disposed about the axis of rotation from the panel and serves as a grip.

17. A door according to claim 9 to be used with a catch suitable for engaging the handle, the catch situated on the outside of the cabinet below the opening, wherein the handle engages the catch when the panel is in the substantially closed position whereby the catch holds the panel in the substantially closed position when the catch is engaged, and the catch can be disengaged from the handle in order to lower the panel to the open position.

18. A door according to claim 17 wherein the handle is substantially bracket-shaped so that the ends of the bracket-shaped handle are rigidly affixed to the hinged edge of the panel and the portion of the handle between the two ends is substantially oppositely disposed about the axis of rotation from the panel and serves as a grip.

* * * * *